(12) United States Patent
Kim et al.

(10) Patent No.: US 12,146,232 B2
(45) Date of Patent: Nov. 19, 2024

(54) ACTIVE LAYER COMPOSITION OF REDUCTION ELECTRODE FOR ELECTROLYSIS AND REDUCTION ELECTRODE DERIVED THEREFROM

(71) Applicant: LG CHEM, LTD., Seoul (KR)

(72) Inventors: Yeon Yi Kim, Daejeon (KR); Hee Jun Eom, Daejeon (KR); Myung Hun Kim, Daejeon (KR); Dong Chul Lee, Daejeon (KR); Sang Yun Jung, Daejeon (KR); Gyo Hyun Hwang, Daejeon (KR); Jong Wook Jung, Daejeon (KR); Yong Ju Bang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 17/051,667

(22) PCT Filed: Jul. 3, 2019

(86) PCT No.: PCT/KR2019/008144
§ 371 (c)(1),
(2) Date: Oct. 29, 2020

(87) PCT Pub. No.: WO2020/009473
PCT Pub. Date: Jan. 9, 2020

(65) Prior Publication Data
US 2021/0189575 A1    Jun. 24, 2021

(30) Foreign Application Priority Data
Jul. 6, 2018    (KR) .................. 10-2018-0078915

(51) Int. Cl.
*C25B 11/093* (2021.01)
*C25B 1/04* (2021.01)
*C25B 11/02* (2021.01)
*C25B 11/095* (2021.01)
*C25B 11/097* (2021.01)

(52) U.S. Cl.
CPC .............. *C25B 11/093* (2021.01); *C25B 1/04* (2013.01); *C25B 11/02* (2013.01); *C25B 11/095* (2021.01); *C25B 11/097* (2021.01)

(58) Field of Classification Search
CPC .... C25B 11/091; C25B 11/093; C25B 11/095
See application file for complete search history.

(56) References Cited

U.S. PATENT DOCUMENTS

| | | |
|---|---|---|
| 3,906,122 A | 9/1975 | Krause et al. |
| 4,361,602 A | 11/1982 | Torikai et al. |
| 4,900,419 A | 2/1990 | Nishiki et al. |
| 4,940,524 A | 7/1990 | Perineau et al. |
| 5,035,779 A | 7/1991 | Nishiki et al. |
| 5,622,613 A | 4/1997 | Arimoto et al. |
| 5,679,225 A | 10/1997 | Pastacaldi et al. |
| 6,017,430 A | 1/2000 | Hodgson et al. |
| 6,312,571 B1 | 11/2001 | Nara et al. |
| 2003/0054953 A1 | 3/2003 | He et al. |
| 2004/0188247 A1 | 9/2004 | Hardee |
| 2007/0261968 A1 | 11/2007 | Carlson et al. |
| 2008/0075877 A1 | 3/2008 | He et al. |
| 2008/0230380 A1 | 9/2008 | Ohsaka et al. |
| 2009/0194411 A1 | 8/2009 | Antozzi et al. |
| 2009/0223815 A1* | 9/2009 | Nara ................ C25B 11/093 204/292 |
| 2012/0027665 A1 | 2/2012 | Henze et al. |
| 2013/0153411 A1 | 6/2013 | Ishimaru |
| 2015/0021197 A1* | 1/2015 | Zhao ................ C25B 1/04 546/10 |
| 2015/0259811 A1 | 9/2015 | Takeuchi |
| 2016/0311028 A1* | 10/2016 | Harutyunyan ....... B01J 35/0013 |
| 2017/0342578 A1 | 11/2017 | Tour et al. |
| 2018/0265996 A1 | 9/2018 | Rosvall et al. |
| 2019/0211464 A1* | 7/2019 | Jung ................ C23C 18/08 |

FOREIGN PATENT DOCUMENTS

| | | |
|---|---|---|
| CN | 1173899 A | 2/1998 |
| CN | 1265432 A | 9/2000 |
| CN | 101525755 A | 9/2009 |
| CN | 103215614 A | 7/2013 |
| CN | 104056741 A | 9/2014 |
| CN | 104937142 A | 9/2015 |
| CN | 106884181 A | 6/2017 |
| CN | 108026650 A | 5/2018 |

(Continued)

OTHER PUBLICATIONS

Machine translation of Choi et al.KR 2019-0037519 A (Year: 2019).*
Liu et al., Synthesis and Characterization of PtRe Alloy Nanoparticles as Electrocatalysts for Methanol Oxidation, Nanoscience and Nanotechnology, vol. 10, No. 7, Jul. 2010, pp. 4266-4272 (Year: 2010).*
Yousaf et al., Enhanced and durable electrocatalytic performance of thin layer PtRu bimetallic alloys on Pd-nanocubes for methanol oxidation reactions, Catalysis Science & Technology, vol. 7, No. 15, Jul. 2017, pp. 3283-3290 (Year: 2017).*
Lai et al., Recent Advances in the Synthesis and Electrocatalytic Applications of Platinum-Based Bimetallic Alloy Nanostructures, ChemCatChem, vol. 7, No. 20, Aug. 2015, pp. 3206-3228 (Year: 2015).*

(Continued)

*Primary Examiner* — Harry D Wilkins, III
(74) *Attorney, Agent, or Firm* — Bryan Cave Leighton Paisner LLP

(57) ABSTRACT

Provided is an active layer composition of a reduction electrode for brine electrolysis containing a metal precursor mixture containing a ruthenium precursor, a platinum precursor, and a lanthanide metal precursor, and an organic solvent containing an alcohol-based compound and an amine-based compound. Also provided is a reduction electrode containing a metal substrate and an active layer that is a dried and heat treated active layer composition positioned on the metal substrate.

10 Claims, No Drawings

(56) References Cited

FOREIGN PATENT DOCUMENTS

| EP | 2915906 A1 | 9/2015 | | |
| --- | --- | --- | --- | --- |
| JP | H08-269763 | 10/1996 | | |
| JP | 2003-277967 | 10/2003 | | |
| JP | 2006193768 A | 7/2006 | | |
| JP | 2006265649 A | 10/2006 | | |
| JP | 2008240001 A | 10/2008 | | |
| JP | 2009-215580 | 9/2009 | | |
| JP | 2010-506050 | 2/2010 | | |
| JP | 2011-190534 | 9/2011 | | |
| JP | 2016-047524 | 4/2016 | | |
| JP | 2016-148074 | 8/2016 | | |
| KR | 10-1995-0011405 | 10/1995 | | |
| KR | 10-2005-0111614 | 11/2005 | | |
| KR | 10-0738646 | 7/2007 | | |
| KR | 10-2007-0099667 | 10/2007 | | |
| KR | 10-2011-0119736 | 11/2011 | | |
| KR | 10-2013-0092368 A | 8/2013 | | |
| KR | 10-2015-0060978 | 6/2015 | | |
| KR | 20190037519 A | * | 4/2019 | ........... C25B 11/041 |
| WO | 2014-207156 | | 12/2014 | |
| WO | WO-2015187100 A1 | * | 12/2015 | ............ B01J 23/462 |
| WO | 2017-050873 | | 3/2017 | |

OTHER PUBLICATIONS

B. Martinez-Vazquez et al., "Scaling-up and characterization of ultralow-loading MEAs made-up by electrospray", International Journal of Hydrogen Energy, vol. 40, Issue 15, 2015, pp. 5384-5389.
Katarzyna Soliwoda et al., "Electrospray deposition of gold nanoparticles from aqueous colloids on solid substrates", Colloids and Surfaces A: Physicochemical and Engineering Aspects, vol. 486, 2015, Accepted Manuscript, 29 pages.
A. Jaworek, "Electrospray droplet sources for thin film deposition," J Mater Sci 42, 266-297 (2007).
Yamanaka et al., "Fabrication of Catalyst Layers for Anion Exchange Membrane Fuel Cells By Using Electrospray Deposition," ECS Transactions, 71 (1) 211-215 (2016).

* cited by examiner

ACTIVE LAYER COMPOSITION OF REDUCTION ELECTRODE FOR ELECTROLYSIS AND REDUCTION ELECTRODE DERIVED THEREFROM

CROSS-REFERENCE TO RELATED APPLICATIONS

This application is a National Stage Application of International Application No. PCT/KR2019/008144 filed on Jul. 3, 2019, which claims the benefit of priority based on Korean Patent Application No. 10-2018-0078915, filed on Jul. 6, 2018, in the Korean Intellectual Property Office, the disclosures of which are incorporated herein by reference in their entirety.

TECHNICAL FIELD

The present invention relates to an active layer composition of a reduction electrode for electrolysis and a reduction electrode derived therefrom.

BACKGROUND

A technology of producing hydroxides, hydrogen, and chlorine by electrolyzing low-cost brine such as seawater is widely known. Such an electrolysis process is also referred to as a chlor-alkali process, the performance and reliability of which have been proven through decades of commercial operation.

As a method for electrolyzing brine, an ion exchange membrane method is currently most widely used, the method in which an ion exchange membrane is installed inside an electrolyzer to divide the electrolyzer into a cation chamber and an anion chamber, and using brine as an electrolyte, chlorine gas is obtained from an anode and hydrogen and caustic soda are obtained from a reduction electrode.

The electrolysis of brine is achieved through a reaction as shown in the following electrochemical reaction formulae:

$2Cl^- \rightarrow Cl_2 + 2e^- (E^0 = +1.36\ V)$    Oxidation electrode reaction:

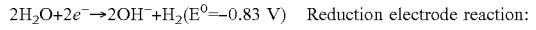
$2H_2O + 2e^- \rightarrow 2OH^- + H_2 (E^0 = -0.83\ V)$    Reduction electrode reaction:

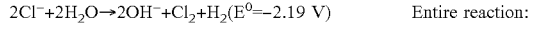
$2Cl^- + 2H_2O \rightarrow 2OH^- + Cl_2 + H_2 (E^0 = -2.19\ V)$    Entire reaction:

In performing the electrolysis of brine, the electrolytic voltage must be determined by taking the voltage theoretically required for the electrolysis of brine, the overvoltage of each of an oxidation electrode (anode) and a reduction electrode (cathode), the voltage by the resistance of an ion exchange membrane, and the voltage by distance between electrodes into account. Among the above voltages, the overvoltage by an electrode acts as an important variable.

Therefore, methods capable of reducing the overvoltage of an electrode have been studied. For example, as an oxidation electrode, a precious metal electrode referred to as a dimensionally stable anode (DSA) has been developed and used, and as for a reduction electrode, there has been also a demand for development of excellent materials which are low in overvoltage and durable.

As such a reduction electrode, stainless steel or nickel has been mainly used. In recent years, in order to reduce overvoltage, methods in which the surface of stainless steel or nickel is coated with any one of a nickel oxide, an alloy of nickel and tin, a combination of activated carbon and an oxide, a ruthenium oxide, platinum, and the like have been studied.

In addition, in order to increase the activity of a reduction electrode by adjusting the composition of an active material, methods in which the composition is adjusted using a platinum group metal such as ruthenium and a lanthanide metal such as cerium have also been studied. However, there have been problems in which overvoltage occurs and deterioration caused by a reverse current occurs.

PRIOR ART DOCUMENT

Patent Document (Patent Document 1) JP2003-277967A

DISCLOSURE OF THE INVENTION

Technical Problem

An aspect of the present invention provides a reduction electrode for electrolysis having excellent performance stability and durability by suppressing overvoltage of a reduction electrode for electrolysis and reducing the deviation between the initial performance and the performance after activation of the electrode.

Technical Solution

According to an aspect of the present invention, there is provided an active layer composition of a reduction electrode for brine electrolysis, the composition including a metal precursor mixture containing a ruthenium precursor, a platinum precursor, and a lanthanide metal precursor, and an organic solvent containing an amine-based compound.

According to another aspect of the present invention, there is provided a reduction electrode for electrolysis, the electrode including a metal substrate, and an active layer positioned on the metal substrate and derived from the active layer composition of a reduction electrode.

Advantageous Effects

According to the present invention, the durability of a reduction electrode for electrolysis, the reduction electrode derived from an active layer composition of a reduction electrode, can be improved by increasing the bed structure of a lanthanide metal on the surface of the electrode, and the overvoltage thereof can be suppressed. Also, since there is almost no difference in performance before and after the activation of the electrode, the reliability of electrode performance evaluation can be increased without an activation process.

DETAILED DESCRIPTION

Hereinafter, the present invention will be described in more detail to facilitate understanding of the present invention.

It will be understood that words or terms used in the specification and claims of the present invention shall not be construed as being limited to having the meaning defined in commonly used dictionaries. It will be further understood that the words or terms should be interpreted as having meanings that are consistent with their meanings in the context and the technical idea of the invention, based on the principle that an inventor can properly define the meaning of the words or terms to best explain the invention.

The term "oxidation electrode" used in the present specification means an electrode in which chlorine gas is generated due to the oxidation reaction of chlorine in the electrolysis of brine. The electrode can be referred to as an anode in that it is an electrode having a positive potential by emitting electrons to cause an oxidation reaction.

Chlorine oxidation reaction: $2Cl^- \rightarrow Cl_2 + 2e^- (E^0 = +1.36\ V)$ The term "reduction electrode" used in the present specification means an electrode in which hydrogen gas is generated due to the reduction reaction of hydrogen in the electrolysis of brine. The electrode can be referred to as a cathode in that it is an electrode having a negative potential by receiving electrons to cause a reduction reaction.

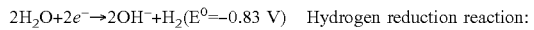
Hydrogen reduction reaction: $2H_2O + 2e^- \rightarrow 2OH^- + H_2 (E^0 = -0.83\ V)$ 1. Active Layer Composition of Reduction Electrode for Electrolysis An active layer composition of a reduction electrode for electrolysis according to an embodiment of the present invention is an active layer composition of a reduction electrode for brine electrolysis, and the composition includes a metal precursor mixture and an organic solvent, wherein the metal precursor mixture contains a ruthenium precursor, a platinum precursor, and a lanthanide metal precursor.

Metal Precursor Mixture

The active layer composition according to an embodiment of the present invention includes a metal precursor mixture as an active ingredient, and the ruthenium precursor can be a material which provides a ruthenium component as an active material to an active layer of a reduction electrode for electrolysis.

The ruthenium precursor can be one or more selected from the group consisting of ruthenium hexafluoride ($RuF_6$), ruthenium (III) chloride ($RuCl_3$), ruthenium (III) chloride hydrate ($RuCl_3 \cdot xH_2O$), ruthenium (III) bromide ($RuBr_3$), ruthenium (III) bromide hydrate ($RuBr_3 \cdot xH_2O$), ruthenium (III) iodide ($RuI_3$), ruthenium (III) iodide hydrate ($RuI_3 \cdot xH_2O$), and acetic acid ruthenium salt. Among the above, ruthenium (III) chloride hydrate is preferable.

Ruthenium is a metal excellent in electrical conductivity and catalytic activity and also quite advantageous in terms of economics. Ruthenium is not easily corroded even under extreme conditions, and thus, can be a metal usefully applicable to a reduction electrode for electrolysis.

The platinum precursor can be a material which provides a platinum component as an active ingredient to an active layer of a reduction electrode for electrolysis.

Platinum can suppress the overvoltage of a reduction electrode for electrolysis and minimize the deviation between the initial performance of the reduction electrode for electrolysis and the performance thereof after a predetermined period of time. As a result, platinum can reduce separate activation processes to the minimum for the reduction electrode for electrolysis, and furthermore, can ensure the performance of the reduction electrode even when an activation process is not performed.

By further including a platinum precursor, an effect exhibited when not just adding platinum as an active ingredient but adding ruthenium and platinum, that is, two or more platinum group metals as active ingredients can be achieved. In this case, based on the fact that the performance of a reduction electrode is improved and the deviation between the initial performance and the performance after activation is small, it can be seen that the performance of an electrode operated in actual fields is stable and electrode performance evaluation results are reliable.

The platinum precursor can be one or more selected from the group consisting of chloroplatinic acid hexahydrate ($H_2PtCl_6 \cdot 6H_2O$), diamine dinitro platinum ($Pt(NH_3)_2(NO)_2$), platinum (IV) chloride ($PtCl_4$), platinum (II) chloride ($PtCl_2$), potassium tetrachloroplatinate ($K_2PtCl_4$), and potassium hexachloroplatinate ($K_2PtCl_6$). Among the above, chloroplatinic acid hexahydrate is preferable.

The active layer composition of a reduction electrode for electrolysis according to an embodiment of the present invention can include the platinum precursor in an amount of 0.01-0.7 mole or 0.02-0.5 mole based on 1 mole of the ruthenium precursor. It is preferable that the platinum precursor is included in an amount of 0.02-0.5 mole.

When the above-mentioned range is met, the overvoltage of a reduction electrode for electrolysis can be significantly suppressed. In addition, since the initial performance and the performance after activation of a reduction electrode for electrolysis are maintained to be constant, an activation process is not required in the performance evaluation of the reduction electrode for electrolysis. Accordingly, the time and costs occurring due to the consumption of test electrodes which are required for the activation process for the performance evaluation of the reduction electrode for electrolysis can be greatly reduced. In addition, it can be more preferable that the content of the platinum precursor is 0.1-0.5 mole based on 1 mole of the ruthenium precursor in terms of durability.

The lanthanide metal precursor is a material which provides a lanthanide metal component to an active layer of a reduction electrode for electrolysis.

The lanthanide metal component can improve the durability of a reduction electrode for electrolysis, thereby minimizing the loss of a platinum group metal such as ruthenium in an active layer of the electrode during activation or electrolysis. Specifically, during the activation or electrolysis of a reduction electrode for electrolysis, particles containing ruthenium in an active layer are not changed in structure and become metallic ruthenium (Ru), or are partially hydrated and reduced to active species. Also, particles containing a lanthanide element in an active layer are changed in structure and forms a network with the particles containing ruthenium in the active layer. As a result, the durability of the reduction electrode for electrolysis is improved, thereby preventing the loss of ruthenium in the active layer.

The lanthanide metal can be one or more selected from the group consisting of cerium, neodymium, promethium, samarium, europium, gadolinium, terbium, dysprosium, holmium, erbium, thulium, ytterbium, and lutetium. Among the above, a cerium-based compound is preferable. When a cerium-based compound is applied, and thus, is present in the form of a cerium oxide in an active layer of a reduction electrode to be finally produced, a microstructure of particles can form a fairly stable structure, which is a bed structure, and can improve the durability of the electrode. Therefore, the cerium-based compound can be most preferably applied.

A cerium-based precursor is one or more selected from the group consisting of cerium (III) nitrate hexahydrate ($Ce(NO_3)_3 \cdot 6H_2O$), cerium (IV) sulfate tetrahydrate ($Ce(SO_4)_2 \cdot 4H_2O$), and cerium (III) chloride heptahydrate ($CeCl_3 \cdot 7H_2O$). Among the above, cerium (III) nitrate hexahydrate is preferable.

The active layer composition of a reduction electrode for electrolysis can include the lanthanide metal precursor in an amount of 0.01-0.5 mole or 0.05-0.35 mole based on 1 mole of the ruthenium precursor. Among the above, it is preferable that the lanthanide metal precursor is included in an amount of 0.05-0.35 mole.

When the above-mentioned range is met, the durability of a reduction electrode for electrolysis is improved, so that it is possible to minimize the loss of ruthenium in an active layer of the electrode for electrolysis during activation or electrolysis.

Amine-Based Compound Contained in Organic Solvent

An amine-based compound contained in the active layer composition according to an embodiment of the present invention can have an effect of reducing the crystal phase of a ruthenium oxide when coating an electrode. In addition, by including an amine-based compound, the size of the bed structure of a lanthanide metal, specifically a cerium oxide, can be increased, and the network structure of a cerium oxide formed therefrom can serve to fix ruthenium oxide particles more firmly. Consequently, the durability of the electrode can be improved thereby. As a result, even when the electrode is operated for a long time, peeling caused by other internal and external factors, such as aging, can be significantly reduced.

The active layer composition of a reduction electrode for electrolysis can include the amine-based compound in an amount of 0.5-10 parts by volume, preferably 1-8 parts by volume, and more preferably 2-6 parts by volume based on 100 parts by volume of the organic solvent. When the amine-based compound is included in the above range, in an active layer of a reduction electrode, the formation of the network structure of a lanthanide metal oxide and the fixing mechanism of platinum group metal oxide particles according to the structure formation can be optimized. As a result, the improvement of durability and the reduction of peeling can be more efficiently achieved.

The amine-based compound is preferably one or more selected from the group consisting of n-octylamine, t-octylamine, isooctylamine, trioctylamine, oleylamine, tributylamine, and cetyltrimethylammonium bromide. Among the above, one or more selected from the group consisting of n-octylamine, t-octylamine, and isooctylamine are preferable.

Alcohol-Based Compound Contained in Organic Solvent

The active layer composition of a reduction electrode for electrolysis according to an embodiment of the present invention can further include an alcohol-based compound as an organic solvent.

One or more alcohol-based compounds can be included, and the alcohol-based compound can be selected from a primary alkyl alcohol and an alkoxyalkyl alcohol. The primary alkyl alcohol can be alcohol having an alkyl group having 1 to 4 carbon atoms, for example, methanol, ethanol, n-propanol, isopropanol, n-butanol, isobutanol, sec-butanol, or tert-butanol.

In addition, the alkoxyalkyl alcohol has an alkyl group to which an alkoxy group having 1 to 4 carbon atoms is coupled as a substituent, and the alkyl group can also have 1 to 4 carbon atoms. For example, the alkoxy group can be methoxy, ethoxy, n-propoxy, isopropoxy, n-butoxy, sec-butoxy, isobutoxy or tert-butoxy, and an alcohol parent can be a material exemplified above as the primary alkyl alcohol.

The alcohol-based compound can be two or more selected from the primary alkyl alcohol and the alkoxyalkyl alcohol, but preferably, can be one or more each selected therefrom. For example, it can be a combination in which isopropanol can be selected as the primary alkyl alcohol and 2-butoxyethanol can be selected as the alkoxyalkyl alcohol. When two or more alcohol-based solvents, in particular, one or more alcohol-based solvents from each group are included as described above, the uniformity of coating during the formation of an active layer can be ensured, and accordingly, the entire area of an electrode can have a uniform composition.

When the active layer composition of a reduction electrode for electrolysis according to an embodiment of the present invention includes an amine-based compound and an alcohol-based compound as an organic solvent in addition to metal precursors which are active ingredients, the network structure of a lanthanide metal oxide can be more firmly formed compared to when not used together, so that the durability improvement effect can be maximized.

2. Reduction Electrode for Electrolysis

A reduction electrode according to another embodiment of the present invention includes a metal substrate, and an active layer positioned on the metal substrate and derived from the active layer composition of a reduction electrode described above.

The metal substrate can be nickel, titanium, tantalum, aluminum, hafnium, zirconium, molybdenum, tungsten, stainless steel or an alloy thereof. Among the above, nickel is preferable.

The shape of the metal substrate can be the shape of a rod, a sheet, or a plate, and the thickness of the metal substrate can be 50-500 μm. The metal substrate is not particularly limited as long as it can be applied to an electrode typically applied to a chlorine alkaline electrolysis process, and the shape and thickness of the metal substrate can follow the examples proposed above.

The active layer is derived from the active layer composition of a reduction electrode for electrolysis according to an embodiment of the present invention, and the active layer can be prepared using a coating step in which the active layer composition of a reduction electrode is applied, dried, and heat treated on at least one surface of a metal substrate.

During the applying, drying, and heat treating processes, without a substantial change in the mixing ratio of metal precursors applied when mixing active layer compositions, that is, the molar ratio of metals, only organic compounds such as an organic solvent can be removed and eliminated. However, an amine-based compound can be present in an active layer of a reduction electrode as an N atom, and the metal precursors can be present in the active layer in the form of oxides.

Before performing the coating step, a step of performing pre-treating on the metal substrate can be included. The pre-treatment can be performing chemical etching, blasting or thermal spraying on a metal substrate to form irregularities on the surface of the metal substrate.

The pre-treatment can be performed by sand blasting the surface of a metal substrate to form fine irregularities, followed by salt treatment or acid treatment. For example, the pre-treatment can be performed by forming irregularities on the surface of a metal substrate by sand blasting the surface with alumina, immersing the surface in a sulfuric acid aqueous solution, and then washing and drying the surface to form fine irregularities thereon.

The coating step can be a coating step in which the active layer composition is applied, dried, and heat treated on at least one surface of the metal substrate. The applying is not particularly limited as long as the active layer composition is evenly applied on a metal substrate, and can be performed by a method known in the art.

The applying can be performed by any one method selected from the group consisting of doctor blade, die casting, comma coating, screen printing, spray spraying, electrospinning, roll coating, and brushing.

The drying can be performed for 5-60 minutes at 50-300° C., and it is preferable that the drying is performed for 5-20 minutes at 50-200° C. When the above conditions are met, a solvent can be sufficiently removed and energy consumption can be reduced to the minimum.

The heat treatment can be performed for one hour or less at 400-600° C., and it is preferable that the heat treatment is performed for 5-30 minutes at 450-550° C. When the above conditions are met, impurities in the active layer can be easily removed while not affecting the strength of the metal substrate.

The coating can be performed by sequentially repeating the applying, drying and heat treatment such that ruthenium per unit area ($m^2$) of a metal substrate is 10 g or greater. That is, in a production method according to another embodiment of the present invention, after applying, drying and heat treating the active layer composition on at least one surface of a metal substrate, coating of applying, drying and heat treating the active layer composition can be repeatedly performed on the one surface of the metal substrate applied with the active layer composition for the first time.

A reduction electrode for electrolysis according to another embodiment of the present invention can further include a hydrogen adsorption layer, and the hydrogen adsorption layer can be positioned on an active layer and include one or more selected from the group consisting of a tantalum oxide, a nickel oxide, and carbon.

The hydrogen adsorption layer is a layer for improving the activity of a reduction electrode such that hydrogen gas is more easily generated in the reduction electrode for electrolysis. The hydrogen adsorption layer can be present in an amount which may not hinder the oxidation-reduction reaction of hydrogen ions or water of a hydrogen layer.

The hydrogen adsorption layer can include pores. The hydrogen adsorption layer can be positioned such that one or more selected from the group consisting of a tantalum oxide, a nickel oxide, and carbon is present in an amount of 0.1-10 mmol/$m^2$. When the above conditions are met, hydrogen adsorption can be promoted without hindering electrolysis.

The hydrogen adsorption layer can be prepared by a thermal decomposition method, or can be prepared by fixing one or more selected from the group consisting of a tantalum oxide, a nickel oxide, and carbon on the surface of the active layer using an appropriate resin followed by coating, or followed by pressing. Alternatively, the hydrogen adsorption layer can be prepared by melt plating, chemical vapor deposition, physical vapor deposition, vacuum deposition, sputtering, or ion plating.

The reduction electrode for electrolysis according to an embodiment of the present invention can be used in electrolyzing brine. Specifically, the reduction electrode can be used for the electrolysis of an aqueous solution containing chloride. The aqueous solution containing chloride can be an aqueous solution containing sodium chloride or potassium chloride.

Hereinafter, the present invention will be described in more detail with reference to Examples and Experimental Examples. However, the present invention is not limited by these Examples and Experimental Examples. Examples according to the present invention can be modified into other various forms, and the scope of the present invention should not be construed as being limited to Examples described below. Examples of the present invention are provided to more fully describe the present invention to those skilled in the art.

Example 1

1) Preparing Active Layer Composition of Reduction Electrode for Electrolysis 2.169 mmol of ruthenium (III) chloride hydrate ($RuCl_3 \cdot xH_2O$) (Manufacturer: Heraeus), 0.241 mmol of chloroplatinic acid hexahydrate ($H_2PtCl_6 \cdot 6H_2O$) (Manufacturer: Heesung Metals), and 0.482 mmol of cerium (III) nitrate hexahydrate ($Ce(NO_3)_3 \cdot 6H_2O$) (Manufacturer: Sigma-Aldrich) were sufficiently dissolved in 2.375 mL of isopropyl alcohol (Manufacturer: Daejung Chemicals & Metals) and 2.375 mL of 2-butoxyethanol (Manufacturer: Daejung Chemicals & Metals), and then 0.25 mL of n-octylamine (Manufacturer: Daejung Chemicals & Metals) was introduced thereto and mixed to prepare an active layer composition of a reduction electrode for electrolysis.

2) Preparing Coating Solution

The active layer composition of a reduction electrode for electrolysis was stirred for 24 hours at 50° C. to prepare a coating solution containing 100 g of ruthenium per 1 L of the solution.

3) Manufacturing Reduction Electrode for Electrolysis

The surface of a nickel substrate (Thickness: 200 μm, purity: 99% or greater) was sand blasted with an aluminum oxide (120 mesh) under a 0.4 MPa condition to form irregularities. The nickel substrate formed with irregularities was immersed in a sulfuric acid aqueous solution (5 M) at 80° C. for 3 minutes to form fine irregularities. Thereafter, the nickel substrate formed with fine irregularities was cleaned with distilled water and then sufficiently dried to prepare a pre-treated nickel substrate.

The pre-treated nickel substrate was coated with the coating solution using a brush, dried in a convection-type drying oven of 180° C. for 10 minutes, and then placed into an electric furnace of 500° C. to be heat treated for 10 minutes. The coating, drying, and heat treatment were each performed for 9 more times, followed by performing heat treatment at 500° C. for 1 hour to manufacture a reduction electrode for electrolysis.

Example 2

A reduction electrode for electrolysis was manufactured in the same manner as in Example 1 except that 1.928 mmol of ruthenium (III) chloride hydrate, 0.482 mmol of chloroplatinic acid hexahydrate, and 0.482 mmol of cerium (III) nitrate hexahydrate were dissolved to prepare an active layer composition of a reduction electrode for electrolysis.

Example 3

A reduction electrode for electrolysis was manufactured in the same manner as in Example 1 except that 1.687 mmol of ruthenium (III) chloride hydrate, 0.723 mmol of chloroplatinic acid hexahydrate, and 0.482 mmol of cerium (III) nitrate hexahydrate were dissolved to prepare an active layer composition of a reduction electrode for electrolysis.

Example 4

A reduction electrode for electrolysis was manufactured in the same manner as in Example 1 except that 2.41 mmol of ruthenium (III) chloride hydrate, 0.0482 mmol of chloroplatinic acid hexahydrate, and 0.482 mmol of cerium (III) nitrate hexahydrate were dissolved to prepare an active layer composition of a reduction electrode for electrolysis.

Example 5

A reduction electrode for electrolysis was manufactured in the same manner as in Example 1 except that 2.41 mmol of ruthenium (III) chloride hydrate, 0.241 mmol of chloroplatinic acid hexahydrate, and 0.482 mmol of cerium (III) nitrate hexahydrate were dissolved to prepare an active layer composition of a reduction electrode for electrolysis.

Example 6

A reduction electrode for electrolysis was manufactured in the same manner as in Example 1 except that 2.41 mmol of ruthenium (III) chloride hydrate, 0.482 mmol of chloroplatinic acid hexahydrate, and 0.482 mmol of cerium (III) nitrate hexahydrate were dissolved to prepare an active layer composition of a reduction electrode for electrolysis.

Example 7

A reduction electrode for electrolysis was manufactured in the same manner as in Example 1 except that 2.41 mmol of ruthenium (III) chloride hydrate, 0.723 mmol of chloroplatinic acid hexahydrate, and 0.482 mmol of cerium (III) nitrate hexahydrate were dissolved to prepare an active layer composition of a reduction electrode for electrolysis.

Example 8

A reduction electrode for electrolysis was manufactured in the same manner as in Example 6 except that the ruthenium (III) chloride hydrate, chloroplatinic acid hexahydrate, and cerium (III) nitrate hexahydrate of Example 6 were sufficiently dissolved in 2.45 mL of isopropyl alcohol (Manufacturer: Daejung Chemicals & Metals) and 2.45 mL of 2-butoxyethanol (Manufacturer: Daejung Chemicals & Metals), and then 0.1 mL of n-octylamine (Manufacturer: Daejung Chemicals & Metals) was introduced thereto and mixed to prepare an active layer composition of a reduction electrode for electrolysis.

Example 9

A reduction electrode for electrolysis was manufactured in the same manner as in Example 6 except that the ruthenium (III) chloride hydrate, chloroplatinic acid hexahydrate, and cerium (III) nitrate hexahydrate of Example 6 were sufficiently dissolved in 2.25 mL of isopropyl alcohol (Manufacturer: Daejung Chemicals & Metals) and 2.25 mL of 2-butoxyethanol (Manufacturer: Daejung Chemicals & Metals), and then 0.5 mL of n-octylamine (Manufacturer: Daejung Chemicals & Metals) was introduced thereto and mixed to prepare an active layer composition of a reduction electrode for electrolysis.

Comparative Example 1

A reduction electrode for electrolysis was manufactured in the same manner as in Example 1 except that n-octylamine was not introduced to prepare an active layer composition of a reduction electrode for electrolysis.

Comparative Example 2

A reduction electrode for electrolysis was manufactured in the same manner as in Example 2 except that n-octylamine was not introduced to prepare an active layer composition of a reduction electrode for electrolysis.

Comparative Example 3

A reduction electrode for electrolysis was manufactured in the same manner as in Example 3 except that n-octylamine was not introduced to prepare an active layer composition of a reduction electrode for electrolysis.

Comparative Example 4

A reduction electrode for electrolysis was manufactured in the same manner as in Example 1 except that 2.41 mmol of ruthenium (III) chloride hydrate and 0.482 mmol of cerium (III) nitrate hexahydrate were sufficiently dissolved in 2.375 mL of isopropyl alcohol and 2.375 mL of 2-butoxyethanol, and then 0.25 mL of n-octylamine was introduced thereto and mixed to prepare an active layer composition of a reduction electrode for electrolysis.

Comparative Example 5

A reduction electrode for electrolysis was manufactured in the same manner as in Example 6 except that n-octylamine was not introduced to prepare an active layer composition of a reduction electrode for electrolysis.

The contents of main components of Examples and Comparative Examples are summarized and shown in Table 1 below.

TABLE 1

| Classification | Ru precursor (mmol) | Pt precursor (mmol) | Ce precursor (mmol) | Ru:Pt | Ru:Ce | Amine-based compound[1] | Alcohol-based compound[1] |
|---|---|---|---|---|---|---|---|
| Example 1 | 2.169 | 0.241 | 0.482 | 1:0.11 | 1:0.22 | 5 | 95 |
| Example 2 | 1.928 | 0.482 | 0.482 | 1:0.25 | 1:0.25 | 5 | 95 |
| Example 3 | 1.687 | 0.723 | 0.482 | 1:0.43 | 1:0.28 | 5 | 95 |
| Example 4 | 2.41 | 0.0482 | 0.482 | 1:0.02 | 1:0.20 | 5 | 95 |
| Example 5 | 2.41 | 0.241 | 0.482 | 1:0.10 | 1:0.20 | 5 | 95 |
| Example 6 | 2.41 | 0.482 | 0.482 | 1:0.20 | 1:0.20 | 5 | 95 |
| Example 7 | 2.41 | 0.723 | 0.482 | 1:0.30 | 1:0.20 | 5 | 95 |
| Example 8 | 2.41 | 0.482 | 0.482 | 1:0.20 | 1:0.20 | 2 | 98 |
| Example 9 | 2.41 | 0.482 | 0.482 | 1:0.20 | 1:0.20 | 10 | 90 |
| Comparative Example 1 | 2.169 | 0.241 | 0.482 | 1:0.11 | 1:0.22 | 0 | 100 |
| Comparative Example 2 | 1.928 | 0.482 | 0.482 | 1:0.25 | 1:0.25 | 0 | 100 |

TABLE 1-continued

| Classification | Ru precursor (mmol) | Pt precursor (mmol) | Ce precursor (mmol) | Ru:Pt | Ru:Ce | Amine-based compound[1] | Alcohol-based compound[1] |
|---|---|---|---|---|---|---|---|
| Comparative Example 3 | 1.687 | 0.723 | 0.482 | 1:0.43 | 1:0.28 | 0 | 100 |
| Comparative Example 4 | 2.41 | — | 0.482 | Pt is not introduced | 1:0.20 | 5 | 95 |
| Comparative Example 5 | 2.41 | 0.482 | 0.482 | 1:0.20 | 1:0.20 | 0 | 100 |

[1]Numerical value of volume-based content of the amine-based compound and alcohol-based compound which were added as an organic solvent based on 100 parts by volume of the organic solvent.

Experimental Example 1: Effect Depending on Whether Octylamine is Introduced or not The reduction electrode of each of Examples and Comparative Examples, a Pt wire as a counter electrode, and a Hg/HgO electrode as a reference electrode were immersed in a NaOH aqueous solution (32 wt %) to manufacture a half cell. The initial voltage of each reduction electrode was measured through a linear sweep voltammetry under the current density condition of $-0.62$ A/cm$^2$, and the results are shown in Tables 2 to 5.

Thereafter, the half cell was treated for 1 hour under the current density condition of $-6$ A/cm$^2$, and then the voltage of each reduction electrode was measured through a linear sweep voltammetry under the current density condition of $-0.62$ A/cm$^2$. The results are shown in Tables 2 to 5.

TABLE 2

| Classification | Ru:Pt:Ce (Molar ratio) | n-octylamine | Initial performance (V) | Performance after activation (V) |
|---|---|---|---|---|
| Example 1 | About 4.5:0.5:1.0 | Introduced | −1.094 | −1.102 |
| Comparative Example 1 | About 4.5:0.5:1.0 | Not introduced | −1.103 | −1.103 |

TABLE 3

| Classification | Ru:Pt:Ce (Molar ratio) | n-octylamine | Initial performance (V) | Performance after activation (V) |
|---|---|---|---|---|
| Example 2 | About 4.0:1.0:1.0 | Introduced | −1.087 | −1.084 |
| Comparative Example 2 | About 4.0:1.0:1.0 | Not introduced | −1.095 | −1.087 |

TABLE 4

| Classification | Ru:Pt:Ce (Molar ratio) | n-octylamine | Initial performance (V) | Performance after activation (V) |
|---|---|---|---|---|
| Example 3 | About 3.5:1.5:1.0 | Introduced | −1.075 | −1.077 |
| Comparative Example 3 | About 3.5:1.5:1.0 | Not introduced | −1.091 | −1.085 |

TABLE 5

| Classification | Ru:Pt:Ce (Molar ratio) | n-octylamine | Initial performance (V) | Performance after activation (V) |
|---|---|---|---|---|
| Example 6 | About 5.0:1.0:1.0 | Introduced | −1.077 | −1.079 |
| Example 8 | About 5.0:1.0:1.0 | Introduced | −1.086 | −1.087 |
| Example 9 | About 5.0:1.0:1.0 | Introduced | −1.089 | −1.087 |
| Comparative Example 5 | About 5.0:1.0:1.0 | Not introduced | −1.095 | −1.093 |

Referring to Tables 2 to 5, in the case of Example 1 and Comparative Example 1 of Table 2, the initial performance and the performance after activation were all poor when n-octylamine was not introduced. However, in the case of Example 1 in which n-octylamine was introduced, it was confirmed that the initial performance thereof was significantly improved. In addition, in the case of Example 2 and Comparative Example 2 of Table 3, it was confirmed that the initial performance and the performance after activation were greatly improved. In the case of Example 3 and Comparative Example 3 of Table 4, it was also confirmed that the degree of the improvement was more noticeable.

In addition, when looking at the data of Tables 2 to 4, it was confirmed that when an amine-based compound such as n-octylamine was introduced, the overvoltage improvement effect according to an increase in the content of Pt was significant compared to when n-octylamine was not introduced. Therefore, it can be confirmed that the increase in the amount of the amine-based compound and Pt has a synergistic effect.

From the results, it can be expected that if n-octylamine is introduced during the manufacturing of a reduction electrode, the performance of the reduction electrode is significantly improved.

Experimental Example 2: Effect of Including Two or More Platinum Group Metals

Using the half cell manufactured in Experimental Example 1, the initial voltage of each reduction electrode was measured through a linear sweep voltammetry under the current density condition of $-0.62$ A/cm$^2$, and the results are shown in Table 6. Also, the half cell was treated for 1 hour under the current density condition of $-6$ A/cm$^2$, and then the voltage of each reduction electrode was measured through a linear sweep voltammetry under the current density condition of $-0.62$ A/cm$^2$. The results are shown in Table 6.

TABLE 6

| Classification | Ru:Pt:Ce (Molar ratio) | Initial performance (V) | Performance after activation (V) |
|---|---|---|---|
| Example 7 | About 5.0:1.5:1.0 | −1.071 | −1.069 |
| Comparative Example 4 | About 5.0:0:1.0 | −1.120 | −1.094 |

It was confirmed that the initial performance and the performance after activation of Example 7 were equal to or superior to those of Comparative Example 4. From the results, it can be expected that if platinum is introduced during the manufacturing of a reduction electrode, the performance of the reduction electrode is significantly improved.

Experimental Example 3: Effect According to Ratio of Two Platinum Group Metals Using the half cell manufactured in Experimental Example 1, the initial voltage of each reduction electrode was measured through a linear sweep voltammetry under the current density condition of −0.62 A/cm², and the results are shown in Table 7. Also, the half cell was treated for 1 hour under the current density condition of −6 A/cm², and then the voltage of each reduction electrode was measured through a linear sweep voltammetry under the current density condition of −0.62 A/cm². The results are shown in Table 7.

TABLE 7

| Classification | Ru:Pt:Ce (Molar ratio) | Initial performance (V) | Performance after activation (V) |
|---|---|---|---|
| Example 4 | About 5.0:0.1:1.0 | −1.098 | −1.096 |
| Example 5 | About 5.0:0.5:1.0 | −1.087 | −1.082 |
| Example 6 | About 5.0:1.0:1.0 | −1.077 | −1.079 |
| Example 7 | About 5.0:1.5:1.0 | −1.071 | −1.069 |

When looking at the voltage measurement value of the reduction electrode of each of Example 4 to Example 7, it can be confirmed that the initial performance and the performance after activation of the reduction electrode were improved as the amount of introduced platinum was increased. From the results, it can be expected that if platinum is introduced to an optimum ratio during the manufacturing of a reduction electrode, the performance of the reduction electrode is significantly improved.

Experimental Example 4: Evaluation of Durability

The change in the content of Ru and Ce before and after the electrolysis was measured for the half cell manufactured in Experimental Example 1 using a portable XRF (Olympus Corporation, Delta-professional XRF (X-ray Fluorescence spectrometry)), and the results are shown in Table 8 below.

TABLE 8

| Classification | Before electrolysis Ru | After electrolysis Ru | Ru residual rate | Before electrolysis Ce | After electrolysis Ce | Ce residual rate |
|---|---|---|---|---|---|---|
| Example 1 | 3.07 | 2.94 | 95.7 | 3.61 | 3.62 | 100.3 |
| Example 2 | 3.53 | 3.48 | 98.6 | 3.11 | 3.29 | 105.8 |
| Example 3 | 2.10 | 2.08 | 99.0 | 2.77 | 2.70 | 97.5 |
| Example 4 | 3.09 | 2.76 | 89.3 | 3.32 | 2.32 | 69.9 |
| Example 5 | 3.82 | 3.75 | 98.2 | 3.08 | 3.07 | 99.7 |
| Example 6 | 3.59 | 3.79 | 105.5 | 3.50 | 3.32 | 94.8 |
| Example 7 | 3.75 | 3.55 | 94.7 | 3.31 | 2.85 | 86.1 |
| Example 8 | 3.48 | 3.41 | 98.0 | 3.05 | 3.00 | 98.4 |
| Example 9 | 3.65 | 3.80 | 104.1 | 3.24 | 3.19 | 98.5 |
| Comparative Example 1 | 2.79 | 2.67 | 95.7 | 3.01 | 2.29 | 76.1 |
| Comparative Example 2 | 2.57 | 2.96 | 115.2 | 3.02 | 2.88 | 95.4 |
| Comparative Example 3 | 2.67 | 1.86 | 69.6 | 3.05 | 2.55 | 83.6 |
| Comparative Example 4 | 3.07 | 2.94 | 95.7 | 3.10 | 2.61 | 84.2 |
| Comparative Example 5 | 3.35 | 3.21 | 95.8 | 3.21 | 2.58 | 80.4 |

Referring to Table 8, in the case of Examples 1 to 9, the residual rates of Ru and Ce before and after the electrolysis were significantly higher than those in Comparative Examples 1 to 5. That is, it was confirmed that if platinum is included as a catalyst metal together with ruthenium, and simultaneously, an amine-based compound is applied in the preparation of an active layer composition as in the present invention, it is possible to manufacture an electrode having excellent durability.

The invention claimed is:

1. An active layer composition of a reduction electrode, the active layer composition comprising:
   a metal precursor mixture including a ruthenium precursor, a platinum precursor, and a lanthanide metal precursor; and
   an organic solvent including an alcohol-based compound and an amine-based compound,
   wherein the amine-based compound is one or more selected from the group consisting of n-octylamine, t-octylamine, isooctylamine, and tributylamine, and
   wherein the reduction electrode comprises a metal substrate coated with the active layer composition including the amine-based compound.

2. The active layer composition of claim 1, wherein the amine-based compound is present in an amount of 0.5-10 parts by volume based on 100 parts by volume of the organic solvent.

3. The active layer composition of claim 1, wherein the metal precursor mixture comprises, based on 1 mole of the ruthenium precursor, the platinum precursor in an amount of 0.01-0.7 mole.

4. The active layer composition of claim 1, wherein the metal precursor mixture comprises, based on 1 mole of the ruthenium precursor, the lanthanide metal precursor in an amount of 0.01-0.5 mole.

5. The active layer composition of claim 1, wherein the lanthanide metal precursor comprises one or more lanthanide metals selected from the group consisting of cerium, neodymium, promethium, samarium, europium, gadolinium, terbium, dysprosium, holmium, erbium, thulium, ytterbium, and lutetium.

6. The active layer composition of claim 1, wherein the lanthanide metal precursor comprises cerium.

7. The active layer composition of claim 1, wherein the alcohol-based compound comprises one or more selected from the group consisting of a primary alkyl alcohol having an alkyl group of 1 to 4 carbon atoms, and an alkoxyalkyl alcohol having an alkyl group of 1 to 4 carbon atoms to which an alkoxy group of 1 to 4 carbon atoms is coupled as a substituent.

8. The active layer composition of claim 1, wherein the alcohol-based compound comprises:
    a primary alkyl alcohol having an alkyl group of 1 to 4 carbon atoms; and
    an alkoxyalkyl alcohol having an alkyl group of 1 to 4 carbon atoms to which an alkoxy group of 1 to 4 carbon atoms is coupled as a substituent.

9. A reduction electrode comprising:
    a metal substrate; and
    an active layer positioned on the metal substrate, wherein the active layer is a dried and heat treated active layer composition of claim 1.

10. The reduction electrode of claim 9, further comprising a hydrogen adsorption layer on the active layer, wherein the hydrogen adsorption layer includes one or more selected from the group consisting of a tantalum oxide, a nickel oxide, and carbon.

\* \* \* \* \*